United States Patent
Kapadia et al.

(10) Patent No.: US 7,810,106 B2
(45) Date of Patent: Oct. 5, 2010

(54) UNIFORM ACCESS TO ENTITIES IN REGISTERED DATA STORE SERVICES

(75) Inventors: Arshish C. Kapadia, Issaquah, WA (US); Jonah S. Burke, Seattle, WA (US); Howard M. Crow, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 755 days.

(21) Appl. No.: 11/191,771

(22) Filed: Jul. 28, 2005

(65) Prior Publication Data

US 2006/0294051 A1    Dec. 28, 2006

Related U.S. Application Data

(63) Continuation-in-part of application No. 11/165,748, filed on Jun. 23, 2005.

(51) Int. Cl.
*G06F 3/00* (2006.01)
(52) U.S. Cl. .................................................. 719/328
(58) Field of Classification Search ........................ None
See application file for complete search history.

(56) References Cited

U.S. PATENT DOCUMENTS

| | | | |
|---|---|---|---|
| 4,817,140 A | 3/1989 | Chandra et al. | |
| 6,101,607 A | 8/2000 | Bachand et al. | |
| 6,279,030 B1 | 8/2001 | Britton et al. | |
| 6,785,822 B1 | 8/2004 | Sadhwani-Tully | 726/28 |
| 6,915,265 B1 | 7/2005 | Johnson | |
| 6,917,944 B1* | 7/2005 | Prasad et al. | 707/102 |
| 2002/0068573 A1 | 6/2002 | Raverdy et al. | 455/445 |
| 2002/0147706 A1 | 10/2002 | Burnett | |
| 2002/0152210 A1 | 10/2002 | Johnson et al. | 707/9 |
| 2003/0144858 A1 | 7/2003 | Jain et al. | 705/1 |
| 2003/0144892 A1 | 7/2003 | Cowan et al. | 705/8 |

(Continued)

FOREIGN PATENT DOCUMENTS

WO    WO 99/01802    1/1999

(Continued)

OTHER PUBLICATIONS

Microsoft TechNet, Microsoft Office Information Bridge Framework 1.0 Planning and Architecture Guide, Chapter 3—Planning, Jul. 29, 2004.

(Continued)

*Primary Examiner*—Neveen Abel Jalil
*Assistant Examiner*—Kellye D Buckingham

(57) ABSTRACT

A data store catalogue service model is disclosed for exposing disparate data store services to clients without requiring explicit knowledge on how to interact with each disparate service. The data store catalogue service model may maintain interaction details for each data store service that clients may access for interacting with those services. The model may also maintain metadata that may describe the different types of services available for access by clients, the data types used by those services, how to access the data provided by the services, and how to communicate semantically with the services for accessing the service's data. Additionally, the data store may include metadata that enables clients to interact with one or more registered data stores in a number of ways, such as for discovering registered data store services, entities, classes, and/or any associations between related entities within the same or among disparate services.

13 Claims, 16 Drawing Sheets

U.S. PATENT DOCUMENTS

| | | | |
|---|---|---|---|
| 2003/0182452 A1 | 9/2003 | Upton | 709/246 |
| 2003/0208493 A1 | 11/2003 | Hall et al. | 707/100 |
| 2003/0218628 A1 | 11/2003 | Deshpande et al. | |
| 2004/0044866 A1 | 3/2004 | Casazza | |
| 2005/0015619 A1 | 1/2005 | Lee | 726/4 |
| 2005/0091182 A1 | 4/2005 | Chen et al. | |
| 2005/0228803 A1* | 10/2005 | Farmer et al. | 707/100 |

FOREIGN PATENT DOCUMENTS

| | | |
|---|---|---|
| WO | WO 01/33468 A1 | 5/2001 |
| WO | WO 03/030020 A2 | 4/2003 |

OTHER PUBLICATIONS

Journee Enterprise Data Hub, http://www.journee.com/prod_index.html.

Enterprise Application Integration, www.eastidge.net, retrieved as Google's text-only cache of http://www.eastridge.net/neweast_net/fusebox.asp?fbL=eai&fbSL=6 on Jan 23, 2005.

C.C. Burt, B.R. Bryant, R.R. Raje, A. Olson, M. Auguston, "Model Driven Security: Unification of Authorization Models for Fine-Grain Access Control", EDOC'03.

S.P. Miller, B.C. Neuman, J.I. Schiller, J.H. Saltzer, "Kerberos Authentication and Authorization System", Section E.2.1, Oct. 27, 1998.

P. Samarati, E. Bertino, S. Jajodia, "An Authorization Model For a Distributed Hypertext System", IEEE Transactions on Knowledge and Data Engineering, Aug. 1996, pp. 555-562, vol. 8, Issue 4.

K.Keahey, V. Welch, "Fine-Grain Authorization for Resources Management in the Grid Environment", 2002.

International Search Report, PCT/US06/23564, Feb. 22, 2007. pp. 1-8.

* cited by examiner

| METADATA DATA STORE |||
| --- | --- | --- |
| METHOD IDENTIFIER | METHOD NAME | DATA STORE SERVICE NAME |
| First method | First Method Name | First Service |
| Second method | Second Method Name | First Service |
| Third method | Third Method Name | First Service |
| Fourth method | Fourth Method Name | First Service |
| Fifth method | Fifth Method Name | First Service |
| Sixth method | Sixth Method Name | First Service |
| Seventh method | Seventh Method Name | First Service |
| Eighth method | Eighth Method Name | First Service |
| Ninth method | Ninth Method Name | First Service |
| ⋮ | ⋮ | ⋮ |
| First method | First Method Name | Second Service |
| Second method | Second Method Name | Second Service |
| Third method | Third Method Name | Second Service |
| Fourth method | Fourth Method Name | Second Service |
| ⋮ | ⋮ | ⋮ |

| PARAMETER IDENTIFIER | PARAMETER NAME | ASSOCIATED METHOD |
| --- | --- | --- |
| First parameter | First parameter Name | First Method |
| Second parameter | Second parameter Name | First Method |
| ⋮ | ⋮ | ⋮ |
| First parameter | First parameter Name | Second Method |
| Second parameter | Second parameter Name | Second Method |
| Third parameter | Third parameter Name | Second Method |
| ⋮ | ⋮ | ⋮ |

| PARAMETER TYPE | TAG | PARAMETER IDENTIFIER | DEFAULT VALUE |
| --- | --- | --- | --- |
| String | Identifier | First Parameter | N/A |
| String | Filter | Second Parameter | First Default |
| ⋮ | ⋮ | ⋮ | ⋮ |
| String | Identifier | First Parameter | Second Default |
| String | Filter | Second Parameter | Third Default |
| Integer | Filter | Third Parameter | Fourth Default |
| ⋮ | ⋮ | ⋮ | ⋮ |

*FIG. 5*

| SYSTEM INSTANCES 212 | | |
|---|---|---|
| SERVICE ID | SERVICE NAME | SERVICE TYPE |
| FIRST SERVICE | FIRST SERVICE NAME | SERVICE TYPE 1 |
| SECOND SERVICE | SECOND SERVICE NAME | SERVICE TYPE 1 |
| THIRD SERVICE | THIRD SERVICE NAME | SERVICE TYPE 2 |
| FOURTH SERVICE | FOURTH SERVICE NAME | SERVICE TYPE 3 |
| ⋮ | | |
| FIFTH SERVICE | FIFTH SERVICE NAME | SERVICE TYPE 4 |

*FIG. 9*

| ENTITIES 222 | | |
|---|---|---|
| ENTITY ID | SYSTEM IDENTIFIER | ENTITY TYPE |
| FIRST ENTITY | FIRST SERVICE | ENTITY TYPE 1 |
| SECOND ENTITY | FIRST SERVICE | ENTITY TYPE 2 |
| THIRD ENTITY | SECOND SERVICE | ENTITY TYPE 1 |
| FOURTH ENTITY | SECOND SERVICE | ENTITY TYPE 2 |
| ⋮ | | |
| FIFTH ENTITY | THIRD SERVICE | ENTITY TYPE 3 |

*FIG. 10*

| ENTITY METHODS 232 | | |
|---|---|---|
| ENTITY METHOD ID | ENTITY IDENTIFIER | METHOD TYPE |
| First Entity Method | First Entity | Method Type 1 |
| Second Entity Method | First Entity | Method Type 2 |
| Third Entity Method | Second Entity | Method Type 1 |
| Fourth Entity Method | Second Entity | Method Type 2 |
| ⋮ | | |
| Fourth Entity Method | Third Entity | Method Type 3 |

*FIG. 11*

| INTERNAL ENTITY ASSOCIATIONS 242 | | |
|---|---|---|
| ASSOCIATION ID | ASSOCIATION | ASSOCIATED METHODS |
| FIRST ASSOCIATION | FIRST, SECOND ENTITIES | ASSOCIATED METHOD 1 |
| ⋮ | | |
| SECOND ASSOCIATION | THIRD, FOURTH ENTITIES | ASSOCIATED METHOD 2 |

*FIG. 12*

| EXTERNAL ENTITY ASSOCIATIONS 252 | | |
|---|---|---|
| EXERNAL ASSOCIATION ID | FIRST ASSOCIATION | SECOND ASSOCIATION |
| ASSOCIATION ONE | FIRST ENTITY | FIFTH ENTITY |

*FIG. 13*

| External Entity Association Instance Mappings 254 | | |
|---|---|---|
| External Association ID | First Entity Inst. | Second Entity Inst. |
| Association One | First Entity 1 | Fifth Entity 1 |
| Association Two | First Entity 2 | Fifth Entity 2 |
| | : | |

*FIG. 14*

| | VIEWS 262 | |
|---|---|---|
| VIEW ID | VIEW NAME | VIEW TYPE |
| FIRST VIEW | FIRST VIEW NAME | VIEW TYPE 1 |
| SECOND VIEW | SECOND VIEW NAME | VIEW TYPE 2 |
| ⋮ | | |
| THIRD VIEW | THIRD VIEW NAME | VIEW TYPE 3 |

*FIG. 15*

| View Type | View Fields |
|---|---|
| View Definitions 264 | |
| View Type 1 | Field 1, ... , Field N |
| View Type 2 | Field 7, ..., Field N |
| : | |
| View Type 3 | Field 1 |

*FIG. 16*

UNIFORM ACCESS TO ENTITIES IN REGISTERED DATA STORE SERVICES

PRIORITY CLAIM

This application is a Continuation-In-Part under 35 U.S.C. §120 of U.S. patent application Ser. No. 11/165,748 filed on Jun. 23, 2005, which is incorporated by reference herein in its entirety.

TECHNICAL FIELD

The disclosed technology relates generally to data processing and, more particularly, to enabling clients to discover and interact with one or more entities in one or more registered data store services in a number of ways using one or more uniform access interfaces.

BACKGROUND

Organizations may often use or desire using line-of-business ("LOB") systems to carry out daily operations, for example. Further, many organizations may implement a number of different types of LOB systems to perform particular tasks, such as SAP, SIEBLE and other types of LOB systems. While these LOB systems may potentially offer a great deal of benefits, at the same time organizations may find themselves unexpectedly devoting other resources just to be able to utilize these systems.

For instance, an organization's developer(s) may need to familiarize themselves with the semantics for interacting with each type of different LOB system. While SAP and SIEBLE were mentioned above as examples of LOB systems, any one organization may desire employing other types of LOB systems. Moreover, organizations may desire utilizing several instantiations of a particular LOB system (e.g., SAP) each dedicated to handling particular business related operations in addition to those other types of systems mentioned above. As a result, still more of an organization's resources would need to be invested to be able to leverage those systems.

SUMMARY

The following presents a simplified summary of the subject matter disclosed in further detail herein to provide a basic understanding to the reader. This summary is not an exhaustive or limiting overview of the disclosed subject matter, and is not provided for identifying key and/or critical elements of the subject matter or delineating the scope of the claimed subject matter. Thus, the scope of the claimed subject matter should not be limited in any way by this summary. Its sole purpose is to present some of the concepts in a simplified form as an introduction to the more detailed description that is presented later.

The present example provides a data store catalogue service model that may be implemented as a data store catalogue service system 56 in the manner described herein with regard to FIGS. 5 and 7. The data store catalogue service model may be implemented to expose one or more disparate data store related services to one or more clients without requiring the clients to have explicit knowledge on how to interact with each or any of the disparate services. The data store catalogue service system 56 may maintain interaction details for the data store related services, which the clients may access for interacting with those services. In particular, the data store catalogue service system 56 may implement a metadata data store 50 that may describe the different types of services available for accessing by clients, the data types used by those services, how to access the data provided by the services, and how to communicate semantically with the services for accessing the service's data. The clients may issue one or more requests to access those particular services defined in the metadata data store via one or more application program interfaces ("APIs") exposed to the clients by a data store service catalogue system in a unified manner.

Many of the attendant features will be more readily appreciated as the same becomes better understood by reference to the following detailed description considered in connection with the accompanying drawings.

DESCRIPTION OF THE DRAWINGS

The foregoing summary will become more readily appreciated as the same becomes better understood by reference to the following detailed description, when taken in conjunction with the accompanying drawings, wherein:

FIG. 5 is a diagram of at least a portion of a metadata data store that may be implemented in the data store service catalogue system illustrated in FIG. 4;

FIGS. 9-16 are diagrams one or more other portions of a metadata data store that may be implemented in the data store service catalogue system illustrated in FIG. 4 that may be used in accordance with the process for enabling clients to discover and interact with one or more entities in one or more registered data store services.

Like reference numerals are used to designate like parts in the accompanying drawings.

DETAILED DESCRIPTION

Figure 1:
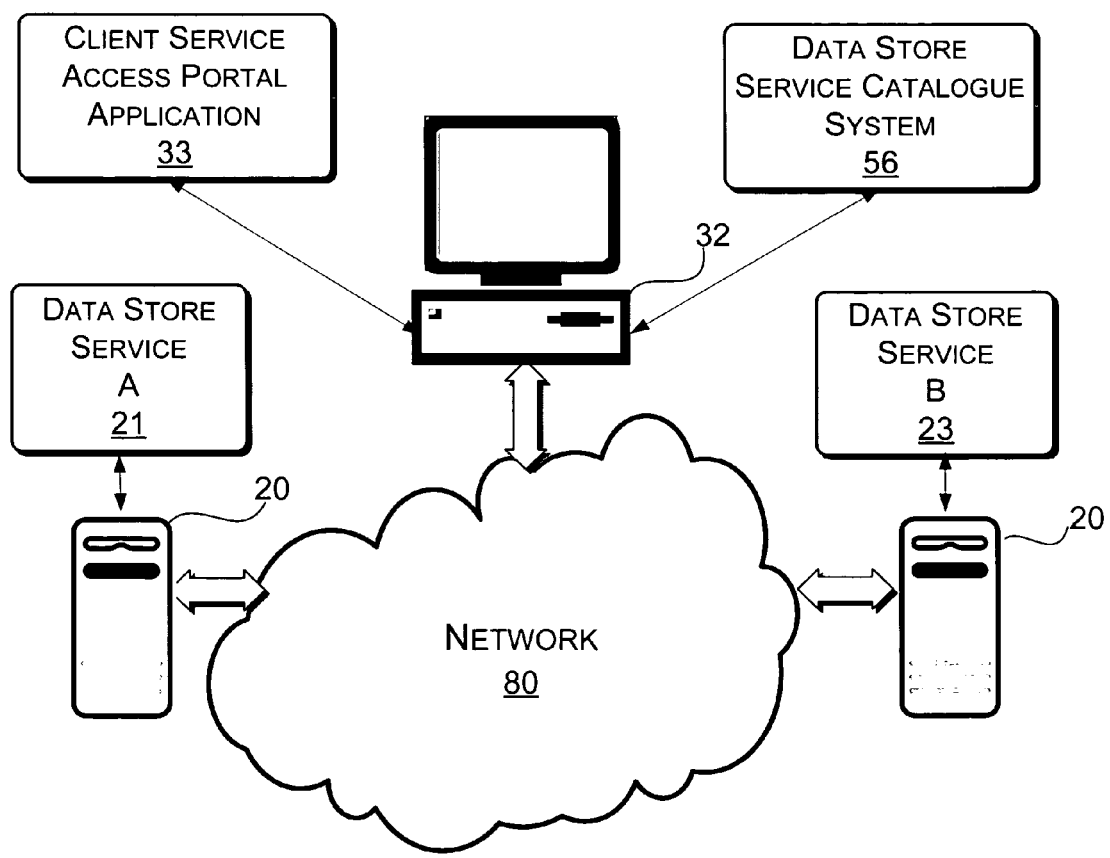
FIG. 1 is a block diagram of at least a portion of a system for registering data store services in cataloguing systems to provide clients with access to disparate data store services in a unified manner.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

An exemplary data store catalogue service system 56 implemented in a system 10 and method 100 for registering data store services in cataloguing systems to provide clients with access to disparate data store services in a unified manner is generally shown in FIGS. 1, 4, 6 and 7. As mentioned above earlier, organizations may often use or desire utilizing a number of different types of LOB systems to perform particular tasks, although organizations may desire implementing other types of software applications besides LOB systems, such as Web services, which may involve the same resource investments for enabling an organization's client applications to use the different types of systems.

In particular, an organization may wind up devoting resources for finding the different systems and identifying their purpose. In addition, these organizations may find themselves devoting even more resources just to be able to programmatically access each of the respective systems' methods, such as for allowing them to develop their own user or other types of access interfaces for accessing the systems. Unfortunately, many such systems typically involve uniquely formatted ways for accessing information from each system's respective data store. For instance, unique parameters, filters and other access nuances often make it difficult for organizations to develop interfaces for accessing the various systems unless the organization's software application developers possess intimate knowledge of each system's semantics.

Data store catalogue service system 56 may be implemented in system 10 in an attempt to address at least some of the issues noted above by providing client applications with one or more unified interfaces for interacting with one or more disparate systems without requiring specific knowledge of the inner workings of those systems, although there may be other uses as well. Basically, data store catalogue service system 56 may provide an environment where one or more disparate systems may be registered in one or more data stores using metadata, for example. The metadata may define methods, parameters and/or default values for one or more of the data store services that may allow clients to be able to interact with the registered services. As a result, application developers may be insulated from having to explicitly program their applications to be able to invoke the appropriate method calls and to process the various types of return values produced by each of the different types of systems.

In particular, data store catalogue service system 56 may implement a metadata data store 50 that may describe the different types of services available for accessing by clients, the data types used by those services, how to access the data provided by the services, and how to communicate semantically with the services for accessing the service's data. The clients may issue one or more requests to access those particular services defined in the metadata data store via one or more application program interfaces ("APIs") exposed to the clients by a data store service catalogue system in a unified manner.

Referring now specifically to FIG. 1, an example of a suitable operating environment in which system 10 may be implemented is illustrated. As shown in FIG. 1, system 10 may generally include at least one computer 32 and one or more application servers 20 that may be coupled together via network 80, although system 10 may include a lesser or greater number and other types of devices.

It should be noted, however, that FIG. 1 is not intended to suggest any limitation as to the scope of use or functionality of the system 10. Other types of computing systems, environments, and/or configurations that may be suitable for use with the system 10 include, but are not limited to, hand-held, notebook or laptop devices, multiprocessor systems, microprocessor-based systems, programmable consumer electronics, network PCs, minicomputers, mainframe computers, distributed computing environments that include any of the above systems or devices, and the like.

Figure 2:
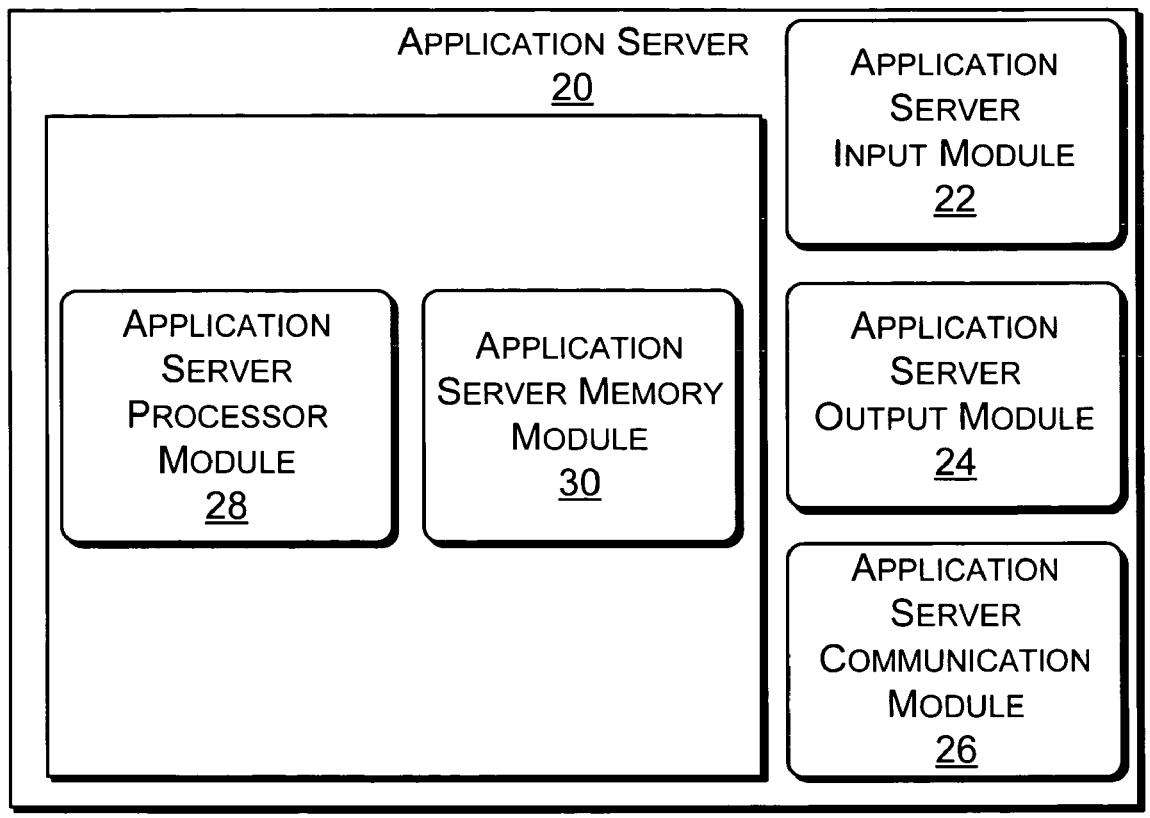
FIG. 2 is a block diagram of an application server that may be used in the system illustrated in FIG. 1.

Referring now to FIG. 2, an exemplary configuration for one or more of the application servers 20 is illustrated. In its most basic configuration, application server 20 may comprise application server input module 22, application server output module 24, application server communication module 26, application server processor module 28 and application server memory module 30, which may be coupled together by one or more bus systems or other communication links, although application server 20 may comprise other modules in other arrangements. Modules 22, 24, 26, 28 and 30 will now be described below with continued reference to FIG. 2.

Application server input module 22 may comprise one or more user input devices, such as a keyboard and/or mouse, and any supporting hardware. Application server input module 22 may enable a user who is operating application server 20 to generate and transmit signals or commands to application server processor module 28, although other types of user input devices may be used.

Application server output module 24 may comprise one or more user output devices, such as a computer monitor (e.g., CRT, LCD or plasma display), and any supporting hardware, although other types of output devices may be used. Application server output module 24 may present one or more results from application server processor module 28 executing instructions stored in application server memory module 30 as described in further detail herein below.

Application server communication module 26 may comprise one or more communication interface devices, such as wire-based (e.g., Ethernet) or wireless network adapters, and any supporting hardware, although other types of communication interface devices may be used, such as serial port interfaces (e.g., RS-232). Application server communication module 26 may enable application server 20 to transmit data to and receive data from other devices via network 80, such as computer 32, although application server communication module 26 may transmit/receive data to/from other computing systems or peripherals (e.g., external memory storage device or printer) via other communication media, such as direct cable connections, for example.

Application server processor module 28 may access data and may execute instructions stored in application server memory module 30 for controlling, monitoring and managing (hereinafter referred to as "operating") application server input module 22, application server output module 24, application server communication module 26 and application server memory module 30 as described herein, although some or all of the data and instructions may be stored in and/or executed by the modules themselves.

Figure 7:
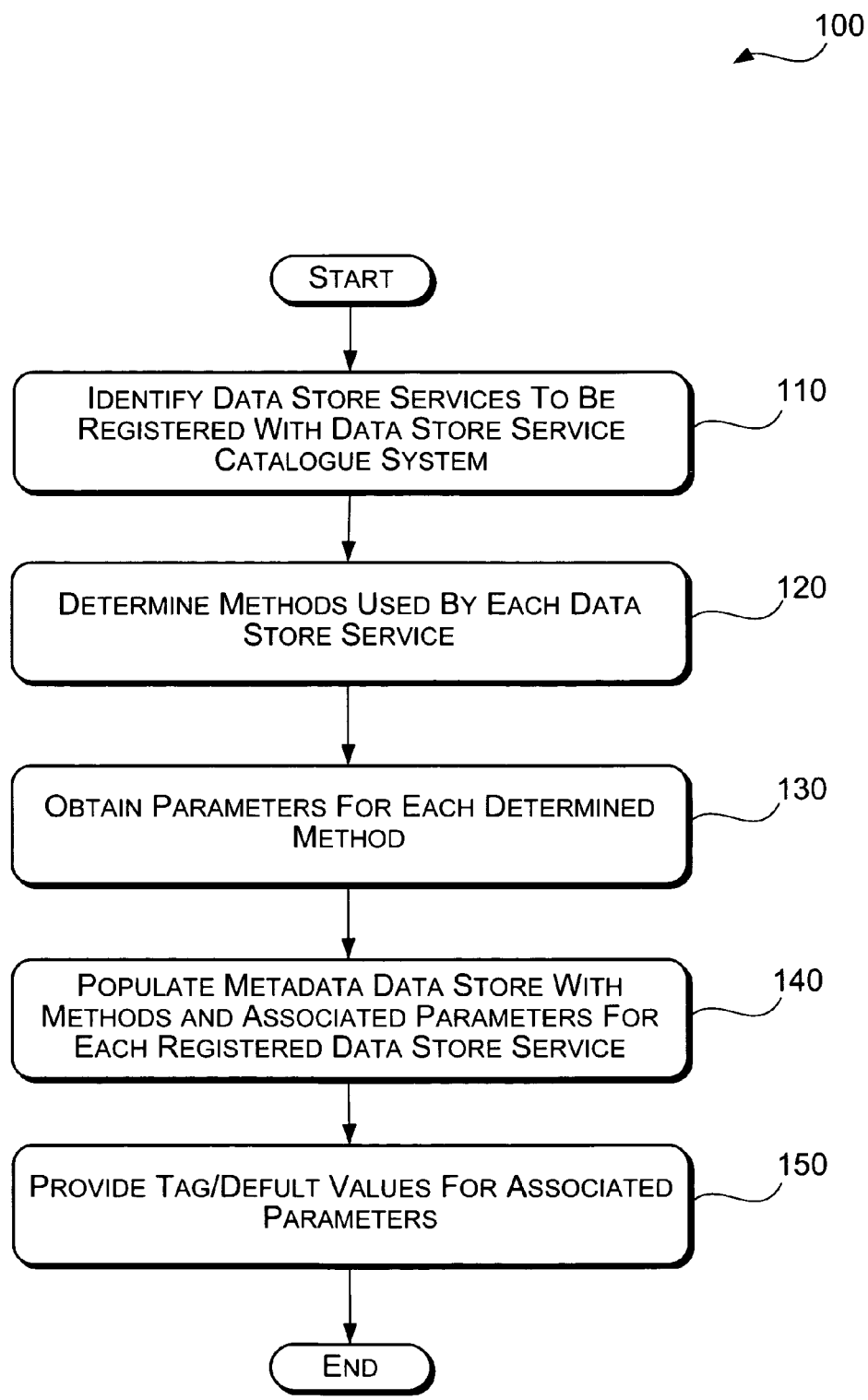
FIG. 7 is a flow chart of a process for registering data store services in cataloguing systems to provide clients with access to disparate data store services in a unified manner.

Additionally, application server processor module 28 may access data and may execute instructions stored in application server memory module 30 to perform functions for implementing at least a portion of the method 100 as described herein and illustrated in FIG. 7, although application server processor module 28 may perform other functions, one or more other processing devices or systems may perform some or all of these functions, and application server processor module 28 may comprise circuitry configured to perform the functions described herein.

Application server memory module 30 may comprise one or more types of fixed and/or portable memory accessible by application server processor module 28, such as ROM, RAM, SRAM, DRAM, DDRAM, hard and floppy-disks, optical disks (e.g., CDs, DVDs), magnetic tape, ferroelectric and ferromagnetic memory, electrically erasable programmable read only memory, flash memory, charge coupled devices, smart cards, or any other type of computer-readable media, which may be read from and/or written to by one or more magnetic, optical, or other appropriate reading and/or writing systems coupled to application server processor module 28 and/or one or more other processing devices or systems.

Application server memory module 30 may store at least a portion of the data and instructions that may be accessed and/or executed by application server processor module 28 for operating application server communication module 26 and application server memory module 30, although some or all of the data and instructions may be stored elsewhere, such as in the modules themselves and/or the application server processor module 28.

Application server memory module 30 in each application server 20 may also store one or more modules, such as data store service "A" 21 and/or data store service "B" 23 shown in FIG. 1, although the modules may be stored elsewhere. Further, data store service "A" 21 and/or data store service "B" 23 may comprise an LOB system, such as SAP or SIEBLE, although data store service "A" 21 and/or data store service "B" 23 may comprise other types of LOB systems or other types of data store services, such as Web services, or any other type of server application. LOB systems, such as SAP and SIEBLE, are types of enterprise or business related software.

Figure 3:
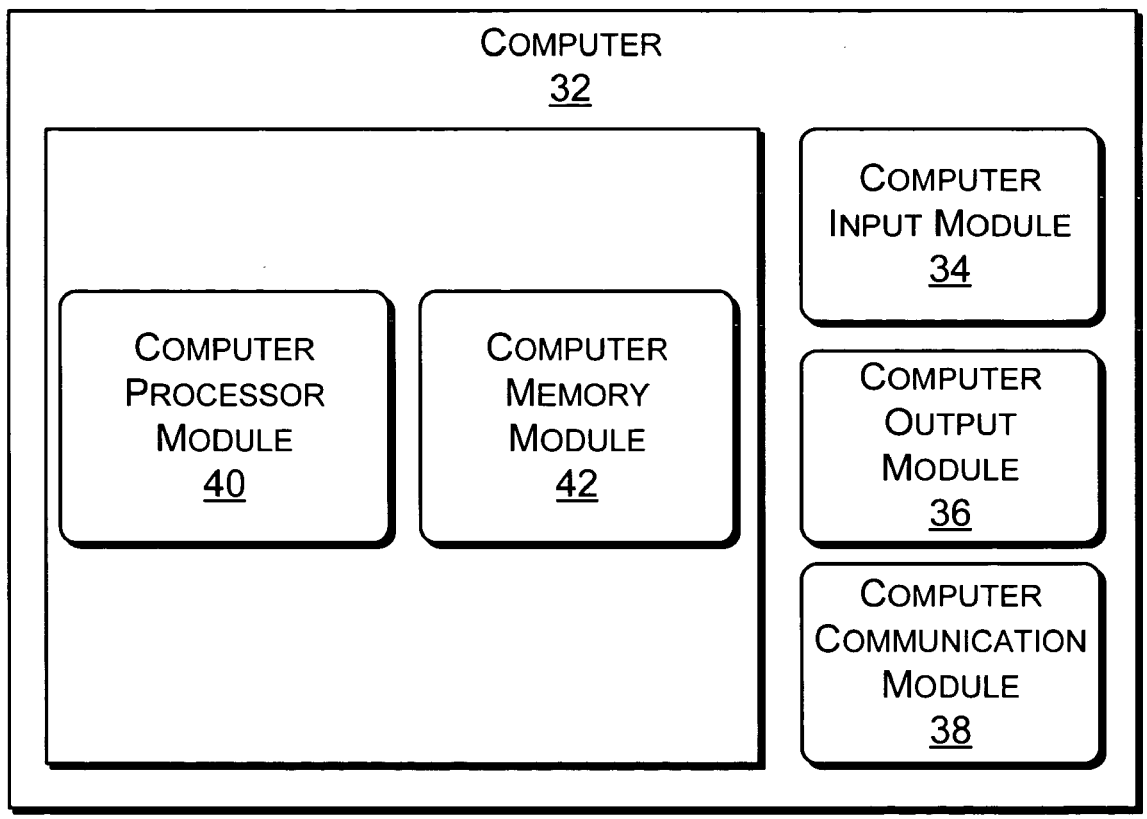
FIG. 3 is a block diagram of a computer that may be used in the system illustrated in FIG. 1.
Figure 4:
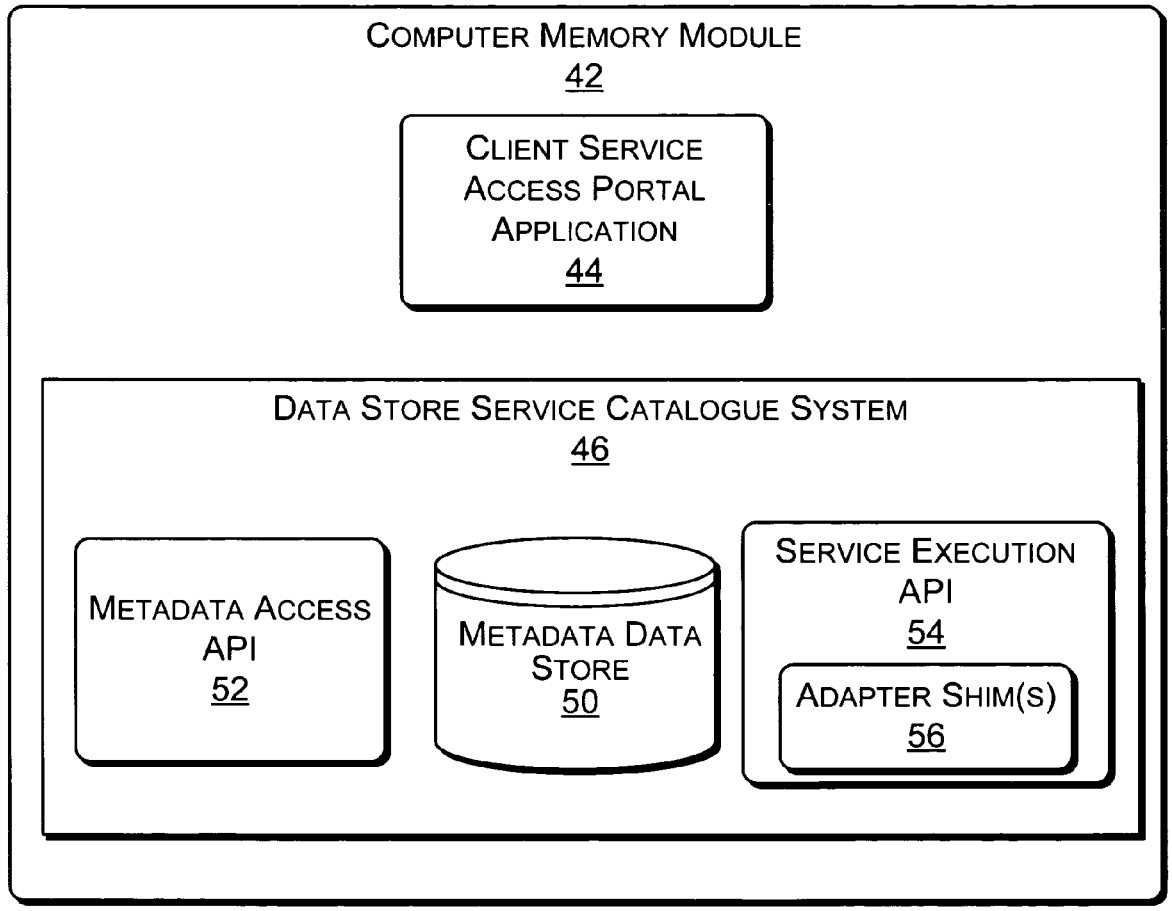
FIG. 4 is a block diagram of a client service access portal application and a data store service catalogue system that may be implemented in the system illustrated in FIG. 1.

Referring to FIG. 3, in its most basic configuration, computer 32 may comprise computer input module 34, computer output module 36, computer communication module 38, computer processor module 40, and computer memory module 42, which may be coupled together by one or more bus systems or other communication links, although computer 32 may comprise other elements in other arrangements. Modules 34, 36, 38, 40 and 42 will now be described below with continued reference to FIG. 4.

Computer input module 34 may comprise one or more user input devices, such as a keyboard and/or mouse, and any supporting hardware. Computer input module 34 may enable a user who is operating computer 32 to generate and transmit signals or commands to computer processor module 40, such as commands for operating client service access portal application 44, although other types of user input devices may be used.

Computer output module 36 may comprise one or more user output devices, such as a computer monitor (e.g., CRT, LCD or plasma display), and any supporting hardware, although other types of output devices may be used. Computer output module 36 may present one or more results from computer processor module 40 executing instructions stored in computer memory module 42 as described in further detail herein below.

Computer communication module 38 may comprise one or more communication interface devices, such as a network interface card (e.g., Ethernet card or wireless network card), and any supporting hardware, although other types of communication interface devices may be used, such as a serial interface (e.g., RS-232 interface). Computer communication module 38 may enable computer 32 to transmit data to or receive data from other devices via network 80, such as one or more application servers 20, although computer communication module 38 may transmit/receive data to/from other computing systems or peripherals (e.g., external memory storage device or printer) via other communication media, such as a direct cable connection, for example.

Computer processor module 40 may access and/or execute data and instructions stored in computer memory module 42 for operating computer input module 34, computer output module 36, computer communication module 38 and computer memory module 42 as described herein, although some or all of the data and instructions may be stored in and/or executed by the modules themselves.

Additionally, computer processor module 40 may access and/or may execute data and instructions stored in computer memory module 42 to perform functions for implementing at least a portion of the method 100 described with reference to FIG. 7, although computer processor module 40 may perform other functions, one or more other processing devices or systems may perform some or all of these functions, and computer processor module 40 may comprise circuitry configured to perform the functions described herein.

Computer memory module 42 may comprise the same types of memory storage devices as application server memory module 30 in application server 20, although other types of computer-readable media may be used, which may be read from and/or written to by one or more magnetic, optical, or other appropriate reading and/or writing systems coupled to computer processor module 40 and/or one or more other processing devices or systems.

Computer memory module 42 may store at least a portion of the data and instructions that may be accessed and/or executed by computer processor module 40 for operating computer input module 34, computer output module 36, computer communication module 38, computer processor module 40 and computer memory module 42, although some or all of the data and instructions may be stored elsewhere, such as in the modules themselves and/or the computer processor module 40.

Computer memory module 42 may also store client service access portal application 44 and data store service catalogue system 46, although the application 44 and system 46 may be stored elsewhere. Client service access portal application 44 and data store service catalogue system 46 may comprise data and/or instructions written in a number of programming languages, which when accessed and/or executed by computer processor module 40, may cause computer 32 to implement at least a portion of the method 100 described with reference to FIG. 7, although the modules may comprise circuitry configured to operate in the manner described herein.

Client service access portal application 44 may access metadata access API 52 to interact with at least one of data store service "A" 21 or data store service "B" 23 implemented on one or more servers 20 as will be described in further detail herein below. Data store service catalogue system 46 may comprise metadata access API 52, metadata data store 50, and service execution API 54, although system 56 may comprise other components in other arrangements. Metadata data store 50 may comprise one or more metadata entries, which may define one or more methods, parameters associated with the methods, and other information related to the semantics for interacting with one or more of data store services "A" 21 and/or "B" 23 that may be implemented on servers 20, although data store 50 may comprise one or more other metadata entries for defining the semantics for interacting with other services or other types of entries besides metadata entries.

Metadata access API 52 may comprise one or more application program interfaces that may accept one or more methods calls and/or parameters for accessing one or more entities that may be defined in metadata data store 50 and which may correspond to one or more entities associated with one or more of data store services "A" 21 and/or "B" 23 that may be implemented on one or more application servers 20.

Service execution API 54 may comprise one or more application program interfaces that may accept one or more methods calls and/or parameters from data store service catalogue system 56 based on the metadata obtained from metadata data store 50 for a particular service 21 and/or 23 that may be implemented on servers 20. Further, service execution API 54 may comprise one or more adapter shims 56 for each of the services 21 and/or 23 that may be implemented on servers 20, such as adapter shim "A" 56A and adapter shim "B" 56B shown in FIG. 7. Adapter shims 56 may comprise low level information that service execution API 54 may use to communicate with data store service interface adapters 60A, 60B shown in FIG. 6, such as information that may specify how to invoke one or more methods associated with data store services 21 and/or 23 that may be exposed by adapter 70. An example includes an SAP .NET Connector software component where data store services 21 and/or 23 may comprise an SAP LOB service, for instance.

It should be appreciated that client service access portal application 44, data store service catalogue system 46 and their associated modules as described above are depicted in the manner shown in FIG. 4 for ease of description and exemplary purposes only. However, client service access portal application 44 and data store service catalogue system 46 may comprise a fewer or greater number and other types of modules that may reside on one or more other computing systems or devices.

Referring back to FIG. 1, network 80 may comprise a Wide Area Network ("WAN"), such as the Internet, although a variety of other communication systems and/or methods using appropriate protocols may be used, including other types of WANs, local area networks, wireless networks, phone lines, serial and/or parallel bus cables, coaxial cables, and combinations thereof.

Figure 6:
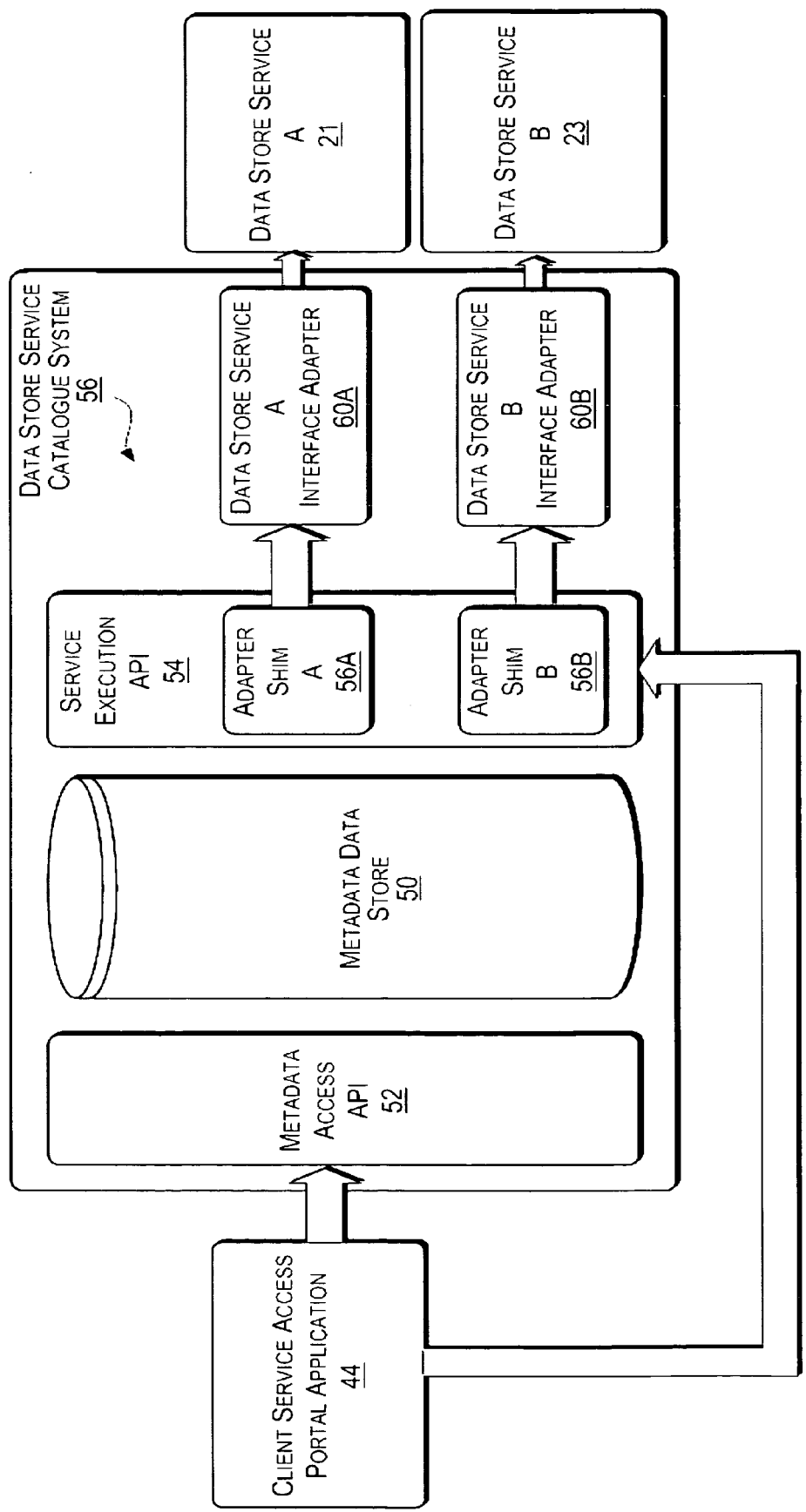
FIG. 6 is a functional block diagram illustrating at least a portion of a process for registering data store services in cataloguing systems to provide clients with access to disparate data store services in a unified manner.

An example of a method 100 for registering a data store service "A" 21 and a data store service "B" 23 will now be described with reference to FIGS. 6-7 in the context of being carried out by the system 10 described above in connection with FIGS. 1-5.

Referring to FIG. 7 and beginning at step 110, by way of example only, a user of computer 32 may operate client service access portal application 44 using the computer's input system, in conjunction with operation of the computer processor module 40, computer memory module 42 and computer communication module 38, to identify which services (e.g., data store service "A" 21, data store service "B" 23) may be available in network 80 for registration with data store service catalogue system 56.

At step 120, the user of computer 32, such as a developer, may determine which one or more methods may be used by each data store service identified above at step 110.

At step 130, the user may identify one or more parameters that may be used for each method identified above at step 120.

At step 140, the user may populate metadata data store metadata data store 50 in the data store service catalogue system 46 with the methods and associated parameters for each data store service to register each service, an example of which is illustrated in FIG. 5. It should be noted that the exemplary parameters and manner in which the tables are organized in FIG. 5 are provided for ease of illustration and descriptive purposes only, as the particular parameters provided and the manner in which they are organized may vary depending on the particular environment they are employed. Further, the examples provided in FIG. 5 may include more or less information for each parameter as required for the particular data services each parameter may be associated with.

At step 150, client service access portal application 44 may provide tag values for associated parameters, such as whether the particular parameter represents an identifier or a filter, although other parameters may be provided. Further, client service access portal application 44 may provide a default value for one or more of the associated parameters included in metadata data store 50. Any default value provided for a particular parameter may depend on the particular data store service that the parameter may be associated with, such as data store service "A" 21 or data store service "B" 23, as well as the type of parameter it is provided for as identified by the parameter's "Tag" entry in the metadata data store 50, shown in FIG. 5.

For instance, a first default value 192 shown in FIG. 5 may specify a particular format for specifying the format in which date values may be filtered when sent back to the client application 44, for example. As an example, the default value 192 shown in FIG. 5 may specify "[Date format=xx/xx/xxxx]," although any other values may be provided. Upon defining each of the tag values and any default values for the parameters, the method 100 may end.

An example of a method 200 for enabling clients to discover and interact with one or more entities in one or more registered data store services, such as data store service "A" 21 and a data store service "B" 23, will now be described with reference to FIGS. 8-16 in the context of being carried out by the system 10 described above in connection with FIGS. 1-7.

Figure 8:
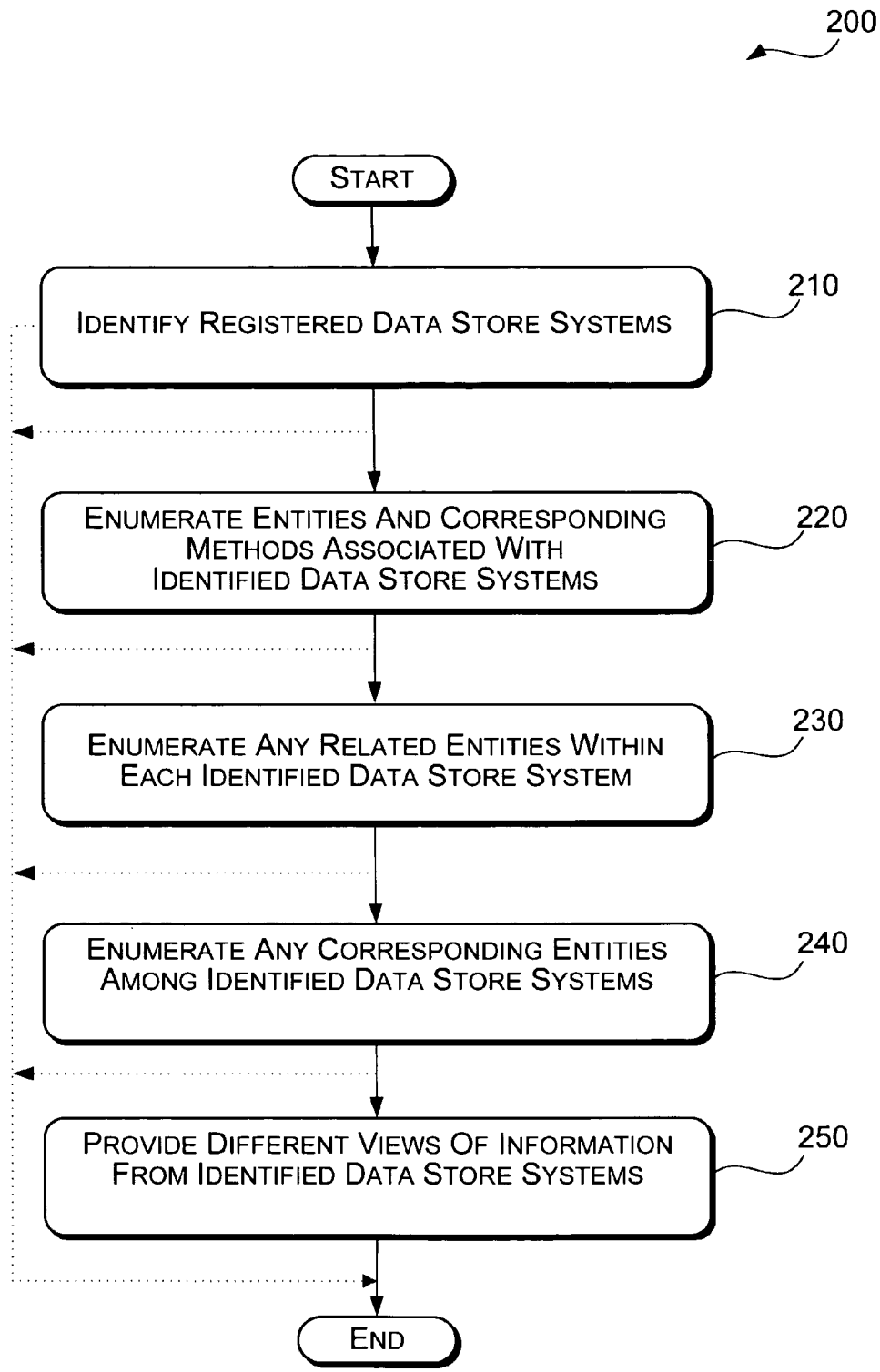
FIG. 8 is a flow chart of a process for enabling clients to discover and interact with one or more entities in one or more registered data store services.

Referring to FIG. 8 and beginning at step 210, by way of example only, a user of computer 32, such as an organization's developer, may operate client service access portal application 44 using the computer's input system, in conjunction with operation of the computer processor module 40, computer memory module 42 and computer communication module 38, to access the data store service catalogue system 46 for a number of reasons, such as for querying the module 38 to identify which services (e.g., data store service "A" 21, data store service "B" 23) may be registered in metadata data store 50, for instance.

Further, a developer may desire querying the module 38 to identify which data store services may be registered in metadata data store 50 so that the developer can develop code that may enable one or more other client computers on the network 80 to access the data store services in a particular manner. However, the developer may not be well versed in coding for one or more of the various data store services that may be registered within the metadata data store 50 for which providing access to the one or more other clients may be desired. Thus, the metadata that may be maintained in metadata data store 50 for each registered data store service may enable the developer with limited coding knowledge to develop code for leveraging one or more of the registered data services.

Further, the metadata data store 50 may be populated with metadata describing one or more services (e.g., data store service "A" 21, data store service "B" 23) registered therein using any number of methods, such as the process described above in connection with method 100, for example, although other methods could be used. For instance, the developer may provide the following line of code to the client service access portal application 44, which in turn would send the code to the data store service catalogue system 46 for further processing as described herein:

IList e=System.GetSystem;

The SystemInstance.GetSystemInstances( )method may be made available to the client service access portal application 44 by the data store service catalogue system 46 via the metadata access API, for example. Responsive to receiving the above-identified from the client application 44, the data store service catalogue system 46 may search for any registered data store services in the metadata data store 50.

Referring to FIG. 9, an exemplary portion of information that may be maintained in the metadata data store 50 to represent one or more registered instances of data store services is illustrated as a system instances 212 table. It should be appreciated that the information illustrated in FIG. 9 is provided for ease of illustration and descriptive purposes only. As shown in FIG. 9, one or more data store service instances are identified under a "Service ID" column and/or a "Service Name" column.

Further, a "Service Type" column in the system instances 212 table may identify the particular type of data store service (e.g., SAP, Sieble). For instance, system instances 212 table shows that there are two registered data store services of "Service Type"="Service Type 1," which represents two instances of the same type of data store service. When the data store service catalogue system 46 identifies the data store services registered in the metadata data store 50, a reference to a listing or enumeration of the services may be made available to the client service access portal application 44, and hence the developer, for example.

At step 220, the developer operating the client service access portal application 44 running on computer 32 may desire determining which "entities" may be associated with and/or exposed by one or more of the registered data store service instances that may have been identified above at step 210 via one or more API's exposed by those services, for example. An entity may represent data and/or one or more methods or logic defined within the registered data store service's native environment that can be implemented by data store service catalogue system 56. For instance, an SAP data store service may define a "Customer" entity and an "Employee" entity that may be associated with one or more methods or logic, for instance, although other entities may be defined. Further, the one or more methods, associated parameters and/or default parameter values that may be associated with each entity associated with a particular data store service instance may be defined by the data store service catalogue system 46 in the metadata data store 50, such as in the exemplary metadata provided in FIG. 5 earlier, for instance.

For a specific example, the developer may provide the following line of code to the client service access portal application 44, which in turn would send the code to the data store service catalogue system 46 for further processing as described herein:

IList e=System.GetSystem.
GetClasses;

Referring to FIG. 10, an exemplary portion of information that may be maintained in the metadata data store 50 to represent one or more entities associated with each of the one or more registered data store services identified above at step 210 is illustrated as an entities instances 222 table. It should be appreciated that the information illustrated in FIG. 10 is provided for ease of illustration and descriptive purposes only. As shown in FIG. 10, one or more data store service instances are identified under an "Entity ID" column. Further, a "System Identifier" column in the entities instances 222 table identifies which of the one or more registered data store services identified above at step 210 the particular entity may be associated with.

Referring back to the example provided above in FIG. 9, since there may be two different instances of the same registered data store services identified above at step 210, each service instance may be associated with the same types of entities (e.g., entity types 1 and 2), although each entity may be defined within metadata data store 50 differently and referred to independently, if desired, for example.

Referring to FIG. 11, another exemplary portion of information that may be maintained in the metadata data store 50 is illustrated as an entity methods 232 table, which may identify one or more methods associated with each of the entities associated with the one or more registered data store services shown in FIG. 10 discussed above. Again, the information illustrated in FIG. 11 is provided for ease of illustration and descriptive purposes only, and the methods identified in the entity methods table 232 may be described or further annotated in the metadata data store 50 in the same manner shown and described above in connection with FIG. 5, although the methods may be defined in other ways.

When the data store service catalogue system 46 identifies the one or more entities and one or more methods associated with each of the one or more data store services registered in the metadata data store 50, a reference to a listing or enumeration of these entities and associated methods may be made available to the client service access portal application 44, and hence the developer, for example. Furthermore, each of the identified entities may support a number of methods, including but not limited to an instantiate( )method for instantiating a particular entity, one or more find( ) and/or findSpecific methods for finding one or more instances of entities in one or more identified data store services registered in the metadata data store 50, one or more getAssociation( )methods for identifying one or more associations among one or more entities defined in the metadata data store 50, one or more getExternalAssociation( )methods for identifying one or more associations among one or more corresponding entities among one or more different data store services registered in the metadata data store 50, and/or GetViews methods.

At step 230, the developer operating the client service access portal application 44 running on computer 32 may desire determining whether any of the entities that may have been identified above at step 220 for each of the registered data store services that may have identified above at step 210 are related to each other. The relationships between the one or more entities may be described in the metadata data store 50 and may be based on one or more relationships defined in the native environment of the particular data store service that the entity may be associated with, for instance, although the metadata data store 50 may be extensible to define non-native entity associates for particular implementation environments, if desired. For example, an SAP data store service may define a relationship between a "Customer" entity and a "Sales Order" entity.

For a specific example, the developer may provide the following line of code to the client service access portal application 44 to enable retrieving any defined associations between the entities in one or more particular data store services, which in turn would send the code to the data store service catalogue system 46 for further processing as described herein:

IList e=SystemInstance.GetAssociations.

Referring to FIG. 12, an exemplary portion of information that may be maintained in the metadata data store 50 to represent one or more associations between one or more entities associated with each of the one or more registered data store services identified above at step 210 is illustrated as internal entities associations 242 table. It should be appreciated that the information illustrated in FIG. 12 is provided for ease of illustration and descriptive purposes only. As shown in FIG. 12, one or more entity associations are identified under an "Association ID" column. Further, an "Association" column in the internal entities associations 242 table identifies which of the one or more entities are associated. Finally, an "Associated Methods" column in the internal entities associations 242 identifies one or more associated methods may be called to retrieve information representing the related entities.

For instance, if the "First Entity" represents a "Customer" and the "Second Entity" represents "Sales Orders" in an SAP data store service environment, then data store service catalogue system 56 would implement the appropriate SAP code that may be defined in the metadata data store 50 to obtain "Sales Order" information for each "Customer" entity maintained by the SAP service, for example. When the data store service catalogue system 46 identifies any associations or relationships among the one or more entities that may be defined in the metadata data store 50, a reference to a listing or enumeration of these entity associations may be made available to the client service access portal application 44, and hence the developer, for example.

At step 240, the developer operating the client service access portal application 44 running on computer 32 may desire determining whether any of the entities that may have been identified above at step 220 for each of the registered data store services that may have identified above at step 210 are related to any other corresponding entities in one or more different data store services that may have been identified above at step 210. For instance, the developer may desire determining and/or leveraging the correspondence between SAP data store service "Customers" and any corresponding Sieble data store service "Customers," for example.

The relationships between the one or more corresponding entities in one or more different data store services may be described in the metadata data store 50. However, these corresponding relationships often may not be defined in the native environment of the particular data store services that the corresponding entities may be associated with and thus this identifying these types of relationships may prove utility to the developer, for instance. For a specific example, the developer may provide the following line of code to the client service access portal application 44 to enable retrieving any defined associations between the entities in one or more particular data store services, which in turn would send the code to the data store service catalogue system 46 for further processing as described herein:

IList e=SystemInstance.GetExternalAssociations.

Referring to FIG. 13, an exemplary portion of information that may be maintained in the metadata data store 50 to represent one or more external associations between one or more corresponding entities in one or more different data store services identified above at step 210 is illustrated as external entity associations 252 table. It should be appreciated that the information illustrated in FIG. 13 is provided for ease of illustration and descriptive purposes only. As shown in FIG. 13, one or more entity associations are identified under an "External Association ID" column.

Further, a "First Association" column in the external entities associations 252 table identifies which of the one or more entities from a first data store services may have an external association. Moreover, a "Second Association" column in the external entities associations 252 table identifies another one or more of the entities from a second data store service that may have an external association with the entity identified under the "First Association" in the same row. For instance, the "First Entity" may represent a "Customer" entity in an SAP data store service environment and the "Second Entity" may represents a corresponding "Customer" in a Sieble data store service environment.

Referring to FIG. 14, another exemplary portion of information that may be maintained in the metadata data store 50 is shown as external entity association instance mappings 254 in FIG. 14 and may describe one or more instances of the associations shown in FIG. 13, for example. When the data store service catalogue system 46 identifies any associations or relationships among the one or more entities that may be defined in the metadata data store 50, a reference to a listing or enumeration of these external entity associations may be made available to the client service access portal application 44.

At step 250, the developer operating the client service access portal application 44 running on computer 32 may desire specifying which properties or fields associated with a particular entity may be output and/or provided to clients that a client data service application may be coded for accessing by the clients. For instance, a "Customer" entity in an SAP data service environment may be associated with over 250 properties. Thus, the developer may desire limited the number of fields that may be displayed to clients to just a few relevant fields that may be appropriate in a particular environment, for example.

For a specific example, the developer may provide the following line of code to the client service access portal application 44 to enable using one or more predefined "views" that may be defined in the metadata data store 50, which in turn would send the code to the data store service catalogue system 46 for further processing as described herein:

System.GetViews.ViewName.

Referring to FIG. 15, an exemplary portion of information that may be maintained in the metadata data store 50 to represent one or more available views that may be defined in the metadata data store 50 is illustrated as views 262 table. It should be appreciated that the information illustrated in FIG. 13 is provided for ease of illustration and descriptive purposes only. As shown in FIG. 15, one or more views are identified under "View ID" and "View Name" columns. Further, a "View Type" column in the views 262 table identifies the particular type of view.

Referring to FIG. 16, another exemplary portion of information that may be maintained in the metadata data store 50 is shown as view definitions 264 table and may describe properties associated with one or more fields defined for each field type defined in the views 262 table shown in FIG. 15, for example. Thus, one or more views may be called for particular instances to allow the developer to manipulate which portions of information associated with one or more entities may be returned and/or presented.

It should be appreciated that steps 210-250 may be performed in any particular order and do not need to be performed in the manner depicted in FIG. 8. If the developer has input all desired portions of code in the manner described in one or more steps 210-250 the method 200 may end, although one or more portions may be repeated as desired.

It should be appreciated that while application server memory module 30 and computer memory module 42 illustrated in FIGS. 2 and 3, respectively, have been described above as comprising computer storage media, the memory modules 30 and 42 should be broadly interpreted to cover communication media as well. Communication media may embody computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example only, communication media includes wired media, such as a wired network or direct-wired connection, and wireless media, such as acoustic, RF, infrared, other wireless media, and combinations thereof.

Further, while the present examples are described and illustrated herein as being implemented in a data store catalogue service system 56, the system 56 described is provided as an example and not a limitation. As those skilled in the art will appreciate, the present examples are suitable for application in a variety of different types of data store catalogue service systems 56 systems.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Further, while particular examples have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. At least one computer-readable storage medium having instructions stored thereon, which when executed by a processing system in conjunction with an application program, allow the application program to access a data store service catalog system maintained for one or more registered data store services of varying types, the instructions comprising:

executing the data store service catalog system, which comprises a metadata application programming interface (API), a service execution API, and metadata describing the data store services, entities thereof, and associations between same types of entities in different types of data store services and between different types of entities in same types of data store services, the metadata also identifying methods that can be submitted to the service execution API that will invoke operations in the different types of data store services to perform the methods;

receiving, via the metadata API, a request for at least a portion of the metadata describing the one or more registered data store services and returning, via the API, the requested metadata to the client;

receiving from the client, via the metadata API, a request comprising indicia of one of the registered data store services returned to the client, and in response returning, via the metadata API, metadata identifying and describing entities stored by the different types of data services;

receiving from the client, via the metadata API, a request comprising indicia of a first one of the identified entities, the first entity being of a first entity type and residing in a first type of data service, and responding, via the metadata API, by using the metadata to identify other entities of the first entity type that reside in a second type of data service; and receiving from the client, via the service execution API, a request comprising methods derived from the metadata to access metadata of the first entity and the second entity, wherein the data store service catalog translates the request to a form native to the first and second types of data service, communicates the translated request to the first and second types of data service, receives results therefrom, and returns the results to the client through the service execution API.

2. The at least one storage medium as set forth in claim 1 wherein the metadata describing the one or more registered data store services comprises an enumeration of the one or more registered data store services.

3. The at least one storage medium as set forth in claim 1 wherein the metadata comprises view information identifying one or more property fields of one or more entities for which information is being requested.

4. At least one computer-readable storage medium having instructions stored thereon, which when executed by a processing system, cause the processing system to perform a process comprising:

providing, via a metadata application programming interface (API), metadata maintained for one or more registered data store services of varying types, where the metadata enables interacting with the registered data store services, the metadata describing the data store services, entities thereof, and associations between same types of entities in different types of data store services and between different types of entities in same types of data store services, the metadata also identifying methods that can be submitted to a service execution API that will invoke operations in the different types of data store services to perform the methods;

responsive to a request via the metadata API from a client, using the metadata to identify to the client a first and second of the registered data store services maintained in a data store service registration repository that are associated with the request, where the first data store service is a different type of data store service than the second data store service; and responsive to a request via the metadata API from the client, providing at least a portion of the metadata associated with the first and second identified data store services that is used by the client to submit a request to the execution service API, and at least one server implements the request by translating it to a request to both the first and second data store services and by translating records of same types of entities from the first and second data store services to a common format to be returned to the client.

5. The storage medium as set forth in claim 4 wherein different of the requests cause the execution service API to execute different communication shims for respective different types of data store services, the shim to be used for a request corresponding to the type of the data store service to which the request corresponds, the communication shims for handling communications with respective data store services.

6. The storage medium as set forth in claim 4 wherein providing at least a portion of the metadata associated with the identified first and second data store services further comprises returning information naming the one or more identified data store services.

7. The storage medium as set forth in claim 4 wherein providing at least a portion of the metadata associated with the first and second data store services further comprises returning information enumerating at least one of either one or more entities or one or more classes associated with the one or more identified data store services.

8. The storage medium as set forth in claim 4 wherein providing at least a portion of the metadata associated with the first and second data store services further comprises returning information enumerating at least one of either corresponding entities from any one of the one or more identified data store services or corresponding entities from at least one of the identified data store services and at least another one of the identified data store services.

9. The storage medium as set forth in claim 4 wherein providing at least a portion of the metadata associated with the first and second identified data store services further comprises providing one or more property fields describing one or more entities for which information is being requested based upon one or more views identified by the client.

10. A computing device to serve as a catalog of LOB system instances, the computing device comprising metadata, one or modules configured to perform a process, the computing device comprising:
   storage storing the metadata, the metadata comprising:
      first metadata identifying different instances of LOB systems and respective types of the instances of LOB systems, where some instances of LOB systems are different instances of a same type of LOB system, and some instances of LOB systems are instances of different types of LOB systems;
      second metadata describing types of entities stored by and available from the LOB system instances, where metadata of an entity has data linking it to an instance of an LOB system identified in the first metadata, and where metadata of an entity has data identifying what type of entity it is;
      third metadata identifying different methods and respective parameters thereof for accessing the entities, where the third metadata links the methods to respective entities described in the second metadata, and where a method linked to an entity comprises a method for retrieving corresponding data in the entity's linked LOB system that;
      fourth metadata comprising first associations, where a first association comprises an association between a first entity and a second entity that are both linked to a same type of LOB instance, the two entities comprising different entity types, where the first association also identifies a method of the corresponding LOB system instance that can be used to retrieve a plurality of entities of the second type that are associated with an entity of the first type; and
      fifth metadata comprising second associations, where a second association comprises an association between a third entity and a fourth entity, the third and fourth entities being linked, respectively, to instances of different types of LOB system instances, the third and fourth entities comprising entities of a same entity type that is found in each of different types of LOB system instances.

11. A computing device according to claim 10, the computing device further comprising the one or more modules for performing the process and providing an application programming interface (API) through which requests are received from the client such that the client can submit, to the instances of different types of LOB systems, requests commonly based on the metadata, the process performed by the one or modules comprising:
   receiving a first request from a client and in response using the first metadata to return to the client an enumeration of the instances of LOB systems;
   receiving a second request from the client, the request comprising identity of a particular one of the instances of LOB systems returned to the client, and responding to the second request by using the second metadata to return to the client an enumeration of entities linked to the particular LOB system instance;
   receiving a third request from the client, the request comprising identity of a particular one of the entities returned to the client, and responding to the third request by using the fourth metadata to return to the client indicia of an entity from the particular LOB system instance that is associated with the particular entity and indicia of a method for retrieving the associated entity; and
   receiving a fourth request from the client, the request comprising identity of a particular one of the entities returned to the client, and responding to the fourth request by using the fifth metadata to return to the client indicia of an entity of the same type as the particular entity but in a LOB system instance of a type different than that in which the particular entity is stored.

12. A computing device according to claim 10, the computing device further comprising the one or more modules for performing the process and providing an application programming interface (API) through which requests are received from the client such that the client can submit, to the instances of different types of LOB systems, requests commonly based on the metadata, the process performed by the one or modules comprising:
   providing to the client metadata identifying a first LOB system instance and a second LOB system instance, the first and second LOB system instances comprising different types of LOB systems; and
   receiving from the client a method requesting entities of a same entity type and in response using the fifth metadata to obtain the requested entities from both the first and second LOB system instances and returning same to the client.

13. The at least one medium as set forth in claim 1 wherein the metadata used to identify other entities of the first entity type that reside in a second type of data service comprises metadata associating entities with entities in different data services.

* * * * *